July 7, 1964   S. A. MENCACCI ET AL   3,139,962
CONTAINER HANDLING APPARATUS
Original Filed Nov. 20, 1957   2 Sheets-Sheet 1
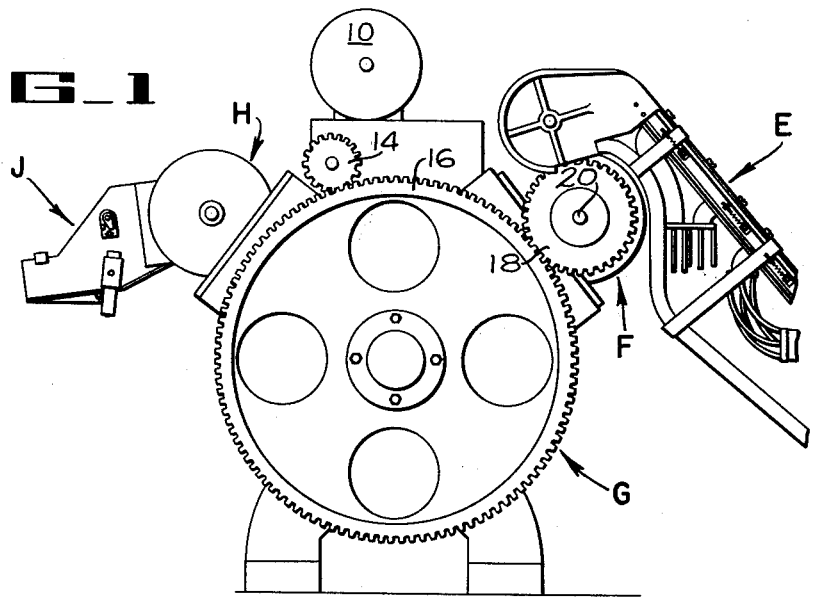
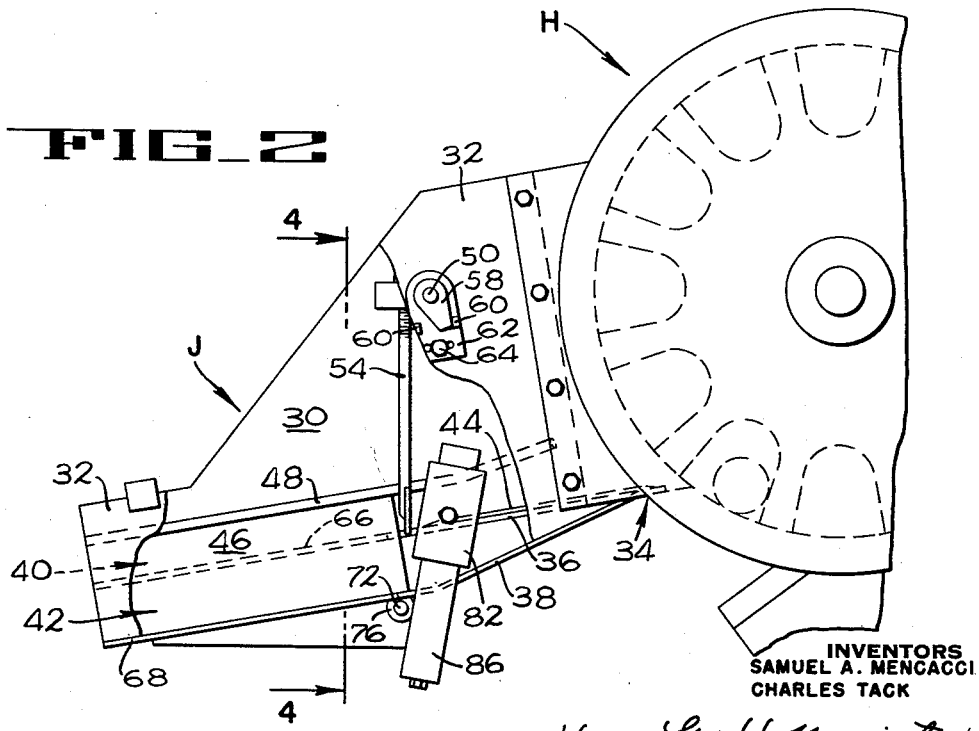
INVENTORS
SAMUEL A. MENCACCI
CHARLES TACK
BY Hans G. Hoffmeister
ATTORNEY

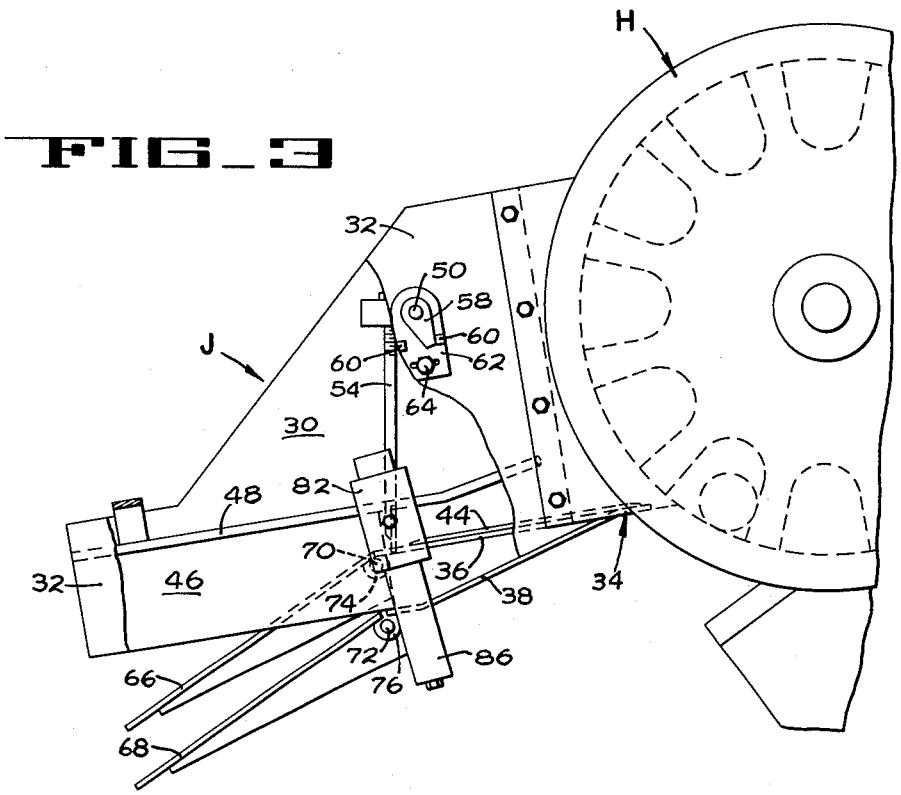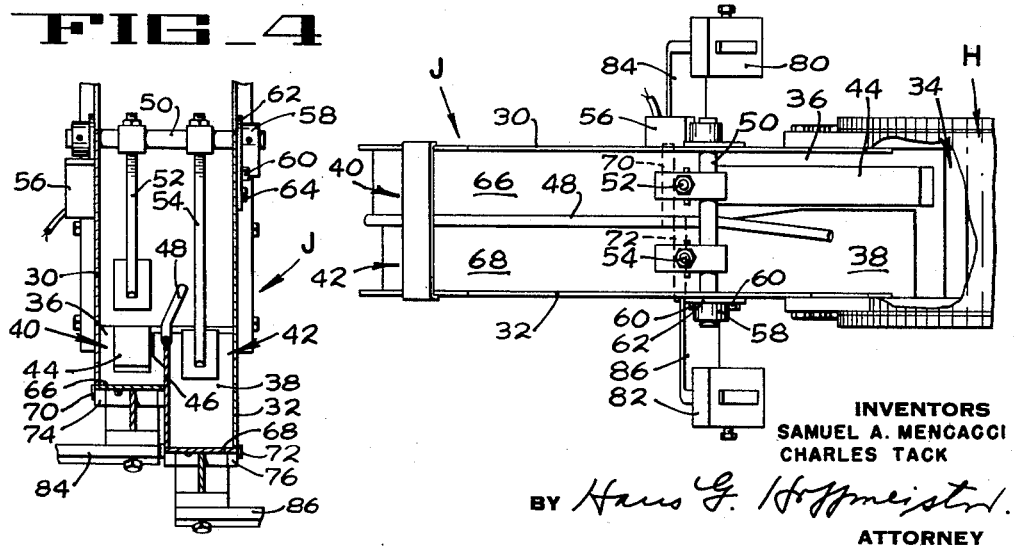

United States Patent Office 3,139,962
Patented July 7, 1964

3,139,962
CONTAINER HANDLING APPARATUS
Samuel A. Mencacci, Wilrijk, Antwerp, and Charles P. Tack, St. Nicolas Waas, Belgium, assignors to International Machinery Corporation S.A., St. Nicolas-Waas, Belgium, a corporation of Belgium
Original application Nov. 20, 1957, Ser. No. 697,709, now Patent No. 2,998,118, dated Aug. 29, 1961. Divided and this application Mar. 20, 1961, Ser. No. 96,809
6 Claims. (Cl. 193—32)

The present invention relates to apparatus for handling articles such as cans or other types of containers, and is particularly concerned with improved discharge means for cookers and similar can handling apparatus.

This application is a division of U.S. application Serial No. 697,709 filed November 20, 1957, now Patent Number 2,998,118 issued August 29, 1961.

Continuous pressure cookers are well known in the food processing industry and usually comprise a reel member having pockets in which food containers, such as cans, are supported and rotated within a closed chamber. Heat is introduced into the chamber through the medium of a hot gas or liquid. The continuous pressure cooker provides a number of advantages, including reduced labor costs, efficient fuel use, minimum handling of the food containers, shortened processing periods, and uniformity of product. Associated with the cooker is a rotary discharge valve which receives cans from the cooker and introduces them double file to the discharge or conveyor mechanism of the present invention. The cans are distributed double file to subsequent processing stations. In accordance with the invention, should a jam or pile up of cans occur at a processing station downstream from the subject discharge mechanism, the discharge mechanism will automatically open and divert cans from the lines. This prevents damage to the discharge valve and to the cooker that would otherwise result from the crushing of non-deliverable cans and allows the cooker to continue to be operated without interruption, and without overcooking the food in the cans. If a misoperation occurs upstream from the subject discharge mechanism, a detector provided for the purpose senses the misoperation and causes the immediate stopping of the cooker and associated apparatus.

An object of the invention is to provide a self clearing discharge or conveyor mechanism for rolling cans and the like.

Another object of the present invention is to provide an article conveyor which automatically diverts articles conveyed thereby when a predetermined weight of articles being conveyed is exceeded.

A further object of the present invention is to provide discharge means for a continuous pressure cooker, which enables the cooker to discharge a plurality of small containers in end to end relation from each of the cooker reel pockets.

Another object of the invention is to make it possible to correct a malfunction that occurs downstream from a cooker in a continuous can processing line, without requiring that operation of the cooker be stopped with the attendant overcooking of the canned material in the cooker.

Still another object of the present invention is to provide a safety device or detector in a continuous cooking system, which device senses cans that are in an abnormal position and, when actuated, automatically discontinues operation of the cooker and associated apparatus.

These and other objects and advantages of the present invention will become apparent from the following description thereof, taken in conjunction with the accompanying drawings, in which:

FIG. 1 is an end elevation of pressure cooker apparatus showing the feed mechanism thereof and the discharge conveyor mechanism of the invention.

FIG. 2 is an enlarged fragmentary, partly broken away side elevation of the can discharge conveyor mechanism of the invention.

FIG. 3 is a side elevation similar to FIG. 2, but showing the mechanism in a can release or diverting position.

FIG. 4 is a fragmentary vertical section taken along line 4—4 of FIG. 2.

FIG. 5 is a top plan of the mechanism shown in FIG. 2.

A continuous pressure cooker and associated apparatus for handling cans filled with a food commodity, such as that shown in FIG. 1, is fully disclosed in the aforesaid parent application Serial No. 697,709. The cans are handled by a conveying mechanism (not shown) which feeds them to an elevator E (FIG. 1). The elevator E lifts the cans to a feed valve F of the pressure cooker G. The cans are transported through the cooker G by means of a rotating reel and a cooperating stationary spiral rail (not shown) defining can compartments, as described in Wilbur Patent No. 2,536,116. After treatment in the cooker G the cans are discharged therefrom through a discharge valve H, and are conducted by the discharge or conveyor mechanism J of the present invention, onto the usual takeaway conveyor (not shown), for further processing.

Details of the can cooker G, the feed valve F, and the discharge valve H are not part of the present invention, a suitable unit being described in the aforesaid patent to Wilbur 2,536,116. The drive means for the cooker and for the feed and discharge valves may also be like that disclosed in the Wilbur patent, the details of such drive means not being part of the present invention. For example, the drive means includes a motor 10 which drives, by suitable means not shown, a pair of spur gears one of which is indicated at 14. These spur gears mesh with large gears 16 mounted at the ends of the shaft that supports the reel within the cooker. A pinion gear 18 mounted on a shaft 20 meshes with the gear 16 at the entrance end of the cooker, and serves to operate the elevator E and the feed valve F of the cooker G. The discharge valve H is similarly driven from the large gear (not seen in FIG. 1) mounted on the reel shaft at the opposite, or discharge end of the cooker.

The cans leave the cooker two at a time, i.e., in two separate lanes, and enter the discharge conveyor J of the present invention, which provides double level or superimposed chutes for the two lanes of cans.

The discharge conveyor mechanism J (FIGS. 2–5) comprises two spaced side walls 30 and 32 between which the two lanes of cans initially roll in end to end relation as they emerge from the valve H. The cans roll along a downwardly inclined floor plate 34. The floor plate 34 is split longitudinally along the major portion of its length, thus providing two ramps 36 and 38 that slope downward at different inclinations from the unsplit part of the plate 34, which is the part first receiving the cans issuing from the discharge valve H. The cans in one lane roll down the upper ramp 36 to an upper discharge chute 40 (FIG. 4) while the cans in the other lane roll down the more steeply sloping ramp 38 to a lower discharge chute 42.

In forming the two ramps 36 and 38, the plate 34 is so cut that the lower ramp 38 is slightly wider than the length of the cans that it is intended to convey. The ramp 38 is of such a width that the beads on both ends of the cans will be supported by the ramp 38. Under these conditions the cans on ramp 38 will roll in a straight line. However, in forming the lower ramp 38 with the width referred to, since the total width of the floor plate 34 is substantially equal to the combined length of two cans, the upper ramp 36 will be narrower than the length of a can with the result that the upper ramp 36 is not wide enough to support both beads of the can. Thus if one bead of the can were to overhang an edge of the ramp, the bead at the other end of the can would roll on the ramp, and the can would not roll in a straight line. To prevent this from happening, a plate 44 is provided on the upper surface of the upper ramp 36 extending longitudinally thereof. The plate 44 is of somewhat lesser width than the distance between the beads of a can, and is of sufficient thickness to engage the central portion of the can, to thereby hold the beads at the ends of the can above the ramp 36 as the can advances. This assures straight line rolling motion of the cans as they progress through the upper discharge chute 40.

A vertical dividing wall 46 (FIG. 4) separates the two discharge chutes 40 and 42 and a bent guide finger 48 (FIGS. 2–5) is fixed to the upper edge of wall 46 and projects toward the discharge valve H from the divider wall 46 to guide the cans from the upper ramp 36 into the upper discharge chute 40.

A transversely extending shaft 50 is rotatably journaled in the side walls 30 and 32 approximately above the rear end of the dividing wall 46. Suspended from the shaft 50 and fixedly secured to the same are two detector arms 52 and 54, one arm being positioned above each of the ramps 36 and 38. The arms 52 and 54 serve to detect any upstanding cans which might pass along the chutes 40 and 42, respectively. Upon detection of any such can, the detector arm and shaft 50 are rotated, and a switch 56 (FIG. 5), to which the shaft 50 is connected is actuated. The switch 56 is connected in the control circuit of the motor 10, and turns off said motor to discontinue operation of the cooker when either detector arm 52 or 54 is deflected by an upstanding can. A finger 58 (FIG. 3) rigid with the shaft 50 is movable between spaced abutment stops 60 on a bracket 62, which limit the rotary movement of the shaft 50 and the detector arms 52 and 54. The shaft 50 is rotatably mounted in the bracket 62, and the bracket 62 is adjustably secured in selected position on side wall 32 by a bolt 64 extending through an arcuate slot in the bracket, and screwed into a tapped hole (not shown) in the side wall 32 of the discharge conveyor J.

In accordance with the invention, the chutes 40 and 42 are provided with floor sections 66 and 68, respectively (FIGS. 3–5), that automatically pivot into a can diverting position in case they become loaded with more moving cans than they customarily handle. Such excessive loading of either floor section 66 or 68 would occur if the associated chute 40 or 42, as the case might be, were to become clogged or jammed because of difficulties arising at some point beyond the floor sections. It is to be noted that the discharging cans are diverted without interrupting the operation of the cooker G.

The floor sections 66 and 68 are mounted on pivot rods 70 and 72, respectively, that are supported in bearings 74 and 76, respectively, secured to the side walls 30 and 32 of the discharge conveyor J adjacent the lower ends of the ramps 36 and 38. The floor sections 66 and 68 are normally maintained in their upper, closed positions by counterweights 80 and 82, respectively, that are secured to the upper ends of upwardly and rearwardly projecting legs of L-shaped brackets 84 and 86, respectively. The horizontal legs of the brackets 84 and 86 are secured to the floor sections 66 and 68, respectively. If and when clogging or jamming should occur in either chute 40 or 42, cans whose normal progress through that chute is interrupted will accumulate until the weight of several cans is imposed upon the movable floor section of that chute, whereupon the floor section will swing downward and thus cause the cans that have come to rest thereon to drop out of the chute. The brackets 84 and 86 are of such configuration that when a floor section 66 or 68 swings downward to its can releasing position, its associated counterweight passes through the vertical plane that lies above the axis of the associated pivot rod with the result that the counterweight then holds the associated floor section in open position until the floor section is manually returned to its original position. This affords an opportunity for the jam that has caused interruption in flow of cans through the chute to be corrected before the floor section 66 or 68, as the case might be, is returned to its position of alignment with the remainder of the floor of its associated chute. Therefore, even though the cooker G and the discharge valve H continue to operate after a jam occurs in either chute 40 and 42, the pile up of cans resulting from such a jam is not permitted to back up to the discharge valve H and cause any damage to the discharge valve H or to other parts of the cooker G.

While a particular embodiment of the present invention has been shown and described, it will be understood that the apparatus is capable of modification and variation without departing from the principles of the invention and that the scope of the invention should be limited only by the scope and proper interpretation of the claims appended hereto.

The invention having thus been described, that which is believed to be new and desired to be protected by Letters Patent is:

1. An article conveyor comprising a chute including a pivotally mounted floor member for temporarily supporting a limited number of the articles as they move along the chute, said floor member being adapted, when an excessive number of the articles accumulate thereon to pivot downwardly and thereby effect discharge of at least some of the accumulated articles, and means urging said floor member toward its article supporting position and arranged to become inoperative as the floor member approaches its article releasing position.

2. An article conveyor comprising a chute including a pivotally mounted floor member adapted to support a predetermined number of the articles for passage thereover and adapted when the weight of a number of the articles greater than said predetermined number is imposed upon the floor member to pivot downward and thereby release from the chute the articles on the floor member, and counterweight means for resisting downward movement of the floor member from article supporting position and for resisting return of the floor member from article releasing position.

3. An article conveyor comprising a chute including a pivotally mounted floor member, bias means for yieldably maintaining said floor member in an upper, article supporting position for supporting a predetermined number of the articles as they move along the chute, accumulation of a number of articles on said floor member in excess of said predetermined number overcoming said bias means causing said floor member to pivot downwardly and thereby effect discharge of accumulated articles, said bias means holding said floor member in its article discharging position after the floor member has reached the latter position.

4. An article conveyor comprising a chute including a pivotally mounted floor member adapted to support a predetermined number of the articles during their passage thereover, counterweight means connected to said floor member, said couterweight means resisting downward movement of the floor member from its article supporting position, the weight of articles in excess of said predetermined number overcoming said counterweight means and causing said floor member to pivot downward and thereby release from the chute the articles on the floor member, said counterweight means also resisting return of the floor member from its article releasing position to its article supporting position.

5. A can conveyor comprising a chute for receiving pairs of cylindrical cans disposed end to end across the chute, said cans having outwardly projecting beads near each end thereof, said chute having a pair of ramps sloping downwardly at different angles, one of said ramps being arranged to support the cans for rolling motion on their beads and the other ramp being arranged to support the cans for rolling motion on their cylindrical body portions between the beads, each ramp leading to a pivotally mounted floor member for supporting a predetermined number of cans in single file, said floor members being disposed at different elevations, bias means connected to each floor member, said bias means resisting downward movement of the respective floor members from their normal can supporting position, the weight of cans on either floor member overcoming said bias means and causing the floor member to pivot downward independently of the other floor member and thereby release cans from the conveyor when the number of cans on a floor member exceeds said predetermined number.

6. A can conveyor comprising a chute for receiving pairs of cans disposed end to end across the chute, said chute having a pair of ramps sloping downwardly at different angles, each ramp leading to a pivotally mounted floor member for supporting a predetermined number of cans in single file, bias means connected to each floor member, said bias means resisting downward movement of the respective floor members from their normal can supporting position, the weight of cans on a respective floor member overcoming said bias means and causing the floor member to pivot downward and thereby release cans when the number of cans on a floor member exceeds said predetermined number, said bias means also resisting return of the respective floor members from their can releasing positions to their can supporting positions.

References Cited in the file of this patent

UNITED STATES PATENTS

| | | |
|---|---|---|
| 884,594 | Lacomme | Apr. 14, 1908 |
| 2,345,415 | Nagy | Mar. 28, 1944 |
| 2,802,560 | Engleson | Aug. 13, 1957 |